(12) United States Patent
Knighton et al.

(10) Patent No.: US 7,359,003 B1
(45) Date of Patent: Apr. 15, 2008

(54) DISPLAY, INPUT AND FORM FACTOR FOR PORTABLE INSTRUMENTS

(75) Inventors: Mark S. Knighton, Santa Monica, CA (US); Marc Goldman, Los Angeles, CA (US); David S. Agabra, Pacific Palisades, CA (US); David D. Drobnis, Mar Vista, CA (US); Jill E. Haynie, Santa Monica, CA (US)

(73) Assignee: Synerdyne Corporation, Santa Monica, CA (US)

( * ) Notice: Subject to any disclaimer, the term of this patent is extended or adjusted under 35 U.S.C. 154(b) by 655 days.

(21) Appl. No.: 09/990,831

(22) Filed: Nov. 9, 2001

(51) Int. Cl.
*H04N 5/225* (2006.01)

(52) U.S. Cl. .................. 348/376; 348/373; 348/375

(58) Field of Classification Search ........ 348/373–376, 348/333.05
See application file for complete search history.

(56) References Cited

U.S. PATENT DOCUMENTS

| | | | | |
|---|---|---|---|---|
| 4,326,783 A | * | 4/1982 | Kawamura et al. | 396/110 |
| 4,494,147 A | | 1/1985 | Komine | |
| 4,864,425 A | * | 9/1989 | Blazek et al. | 386/107 |
| 5,581,399 A | * | 12/1996 | Abe | 359/410 |
| 5,815,741 A | * | 9/1998 | Okuyama et al. | 396/51 |
| 6,160,666 A | * | 12/2000 | Rallison et al. | 359/630 |
| 6,249,309 B1 | * | 6/2001 | Shibata et al. | 725/105 |
| 6,384,863 B1 | * | 5/2002 | Bronson | 348/373 |
| 6,597,346 B1 | * | 7/2003 | Havey et al. | 345/169 |
| 6,851,066 B2 | * | 2/2005 | Obitsu | 713/323 |
| 6,871,010 B1 | * | 3/2005 | Taguchi et al. | 386/120 |
| 2001/0004268 A1 | * | 6/2001 | Kubo et al. | 348/333.02 |
| 2001/0055155 A1 | * | 12/2001 | Kanai et al. | 359/557 |
| 2004/0130645 A1 | * | 7/2004 | Ohmura et al. | 348/333.08 |
| 2004/0237176 A1 | * | 12/2004 | Himmele | 2/426 |

FOREIGN PATENT DOCUMENTS

| | | |
|---|---|---|
| DE | 35 26 638 | 2/1987 |
| JP | 11015398 | 1/1999 |

OTHER PUBLICATIONS

Shimadzu Corp., Patent Abstracts of Japan, vol. 1999, No. 04, Apr. 30, 1999.

* cited by examiner

*Primary Examiner*—Lin Ye
*Assistant Examiner*—Anthony J Daniels
(74) *Attorney, Agent, or Firm*—Blakely, Sokoloff, Taylor & Zafman, LLP

(57) ABSTRACT

A compact appliance providing high resolution display capability in an ergonomically designed package. Subassemblies of the device are mechanically coupled to avoid interference between a user's hands and face while the device is used, while concurrently providing ergonomically located control for substantially all functions of the device.

45 Claims, 13 Drawing Sheets

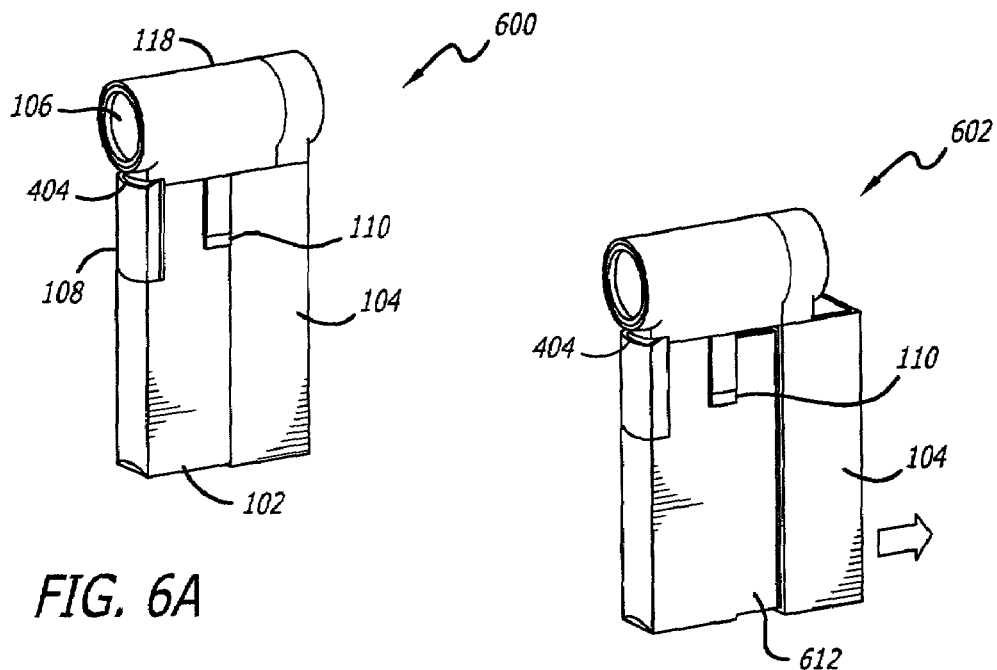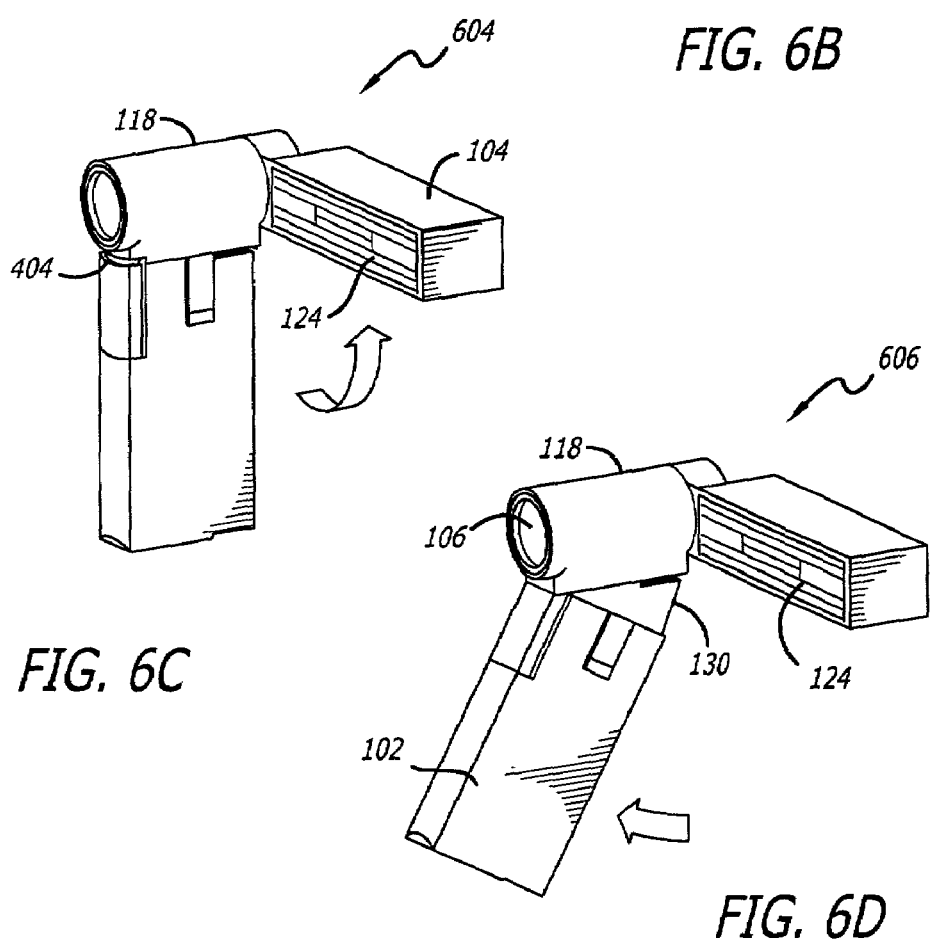

DISPLAY, INPUT AND FORM FACTOR FOR PORTABLE INSTRUMENTS

BACKGROUND OF THE INVENTION

1. Field of the Invention

The invention relates to ergonomic hand held devices. More specifically, the invention relates to user interface display and input technologies in a hand held electronic device.

2. Background

Hand held devices with some level of display capability including hand held computers, personal digital assistants ("PDA's"), cell phones and digital cameras. Displays on hand held devices suffer from a variety of deficiencies. Among these deficiencies are poor resolution, small size and poor readability under both bright and dim ambient conditions. Moreover, these limitations are additive in that small size contributes to poor readability and necessitates reduced resolution.

Digital cameras are increasingly common. Typical digital cameras have a view finder and also a display on which pictures taken may be viewed, typically at a reduced resolution. On some cameras, the display may be used as a substitute view finder for framing the picture to be taken. However, most of these displays suffer from severe degradation as a result of ambient light in bright environments. Even for the camera on which such displays are suitable view finders, the display tends to be inferior to a view with the naked eye and difficult or uncomfortable to use for long-term viewing.

Also, digital cameras and common hand-held devices such as hand-held computers, etc., have relatively poor ergonomics in existing designs. For example, typical digital cameras have a generally rectangular form factor in which it is difficult to get one's eye to the view finder without interference from the hand holding the camera. Moreover, holding the camera in a ready position is relatively uncomfortable over time.

BRIEF DESCRIPTION OF THE DRAWINGS

The invention is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

FIG. 6 shows deployment of the device in one embodiment of the invention.

DETAILED DESCRIPTION OF THE INVENTION

Figure 1:
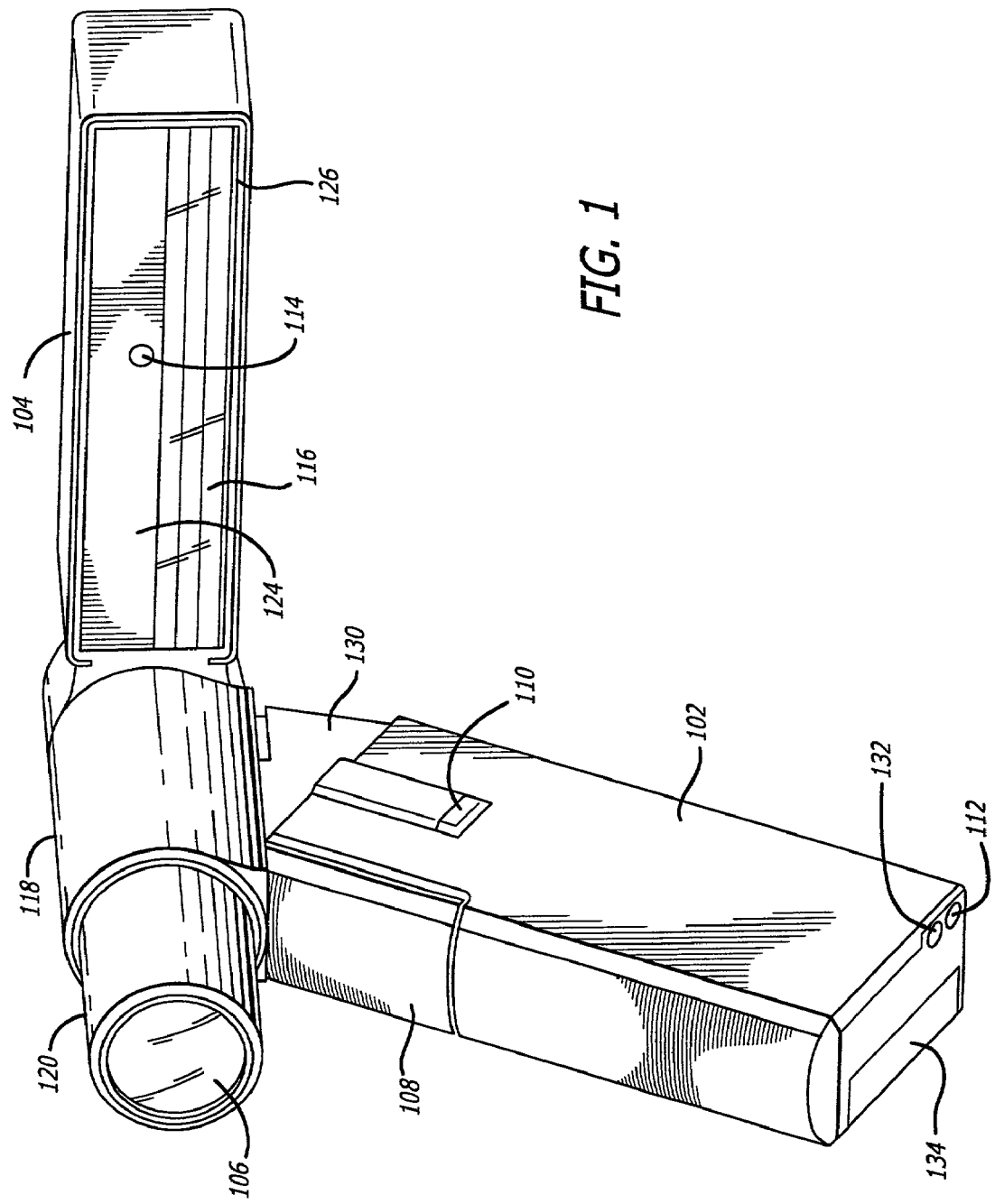
FIG. 1 is a right perspective view of a camera of one embodiment of the invention in a right handed deployed orientation.

FIG. 1 is a right perspective view of a camera of one embodiment of the invention in a right handed deployed orientation. In one embodiment, the camera includes three main subassemblies: a grip 102, a display assembly 104 and an optic subassembly including lens 106. The subassemblies exist in defined mechanical relationships to enhance ergonomics of the device. Lens 106 resides in lens barrel 120 which telescopes from lens housing 118. Lens 106 is in optical communication with an image sensing array (ISA) (not shown) such that when a shutter release occurs, the ISA captures an image as seen by the lens 106. In one embodiment, lens 106 is a zoom lens driven by a motor (not shown). It is expected that some embodiments will also include autofocus capabilities.

A grip 102 is angled forward in the deployed orientation to accommodate comfortable wrist angles for a user. In one embodiment, a majority of the electronic components of the camera will reside within the grip 102. The electronic requirements for digital image capture are generally known. A trigger 108 is provided coupled to grip 102 to provide a shutter release to activate image capture. Shutter release may be something of a misnomer in the context of some digital cameras. As used herein, "shutter release" means the mechanism actuated by a user to initiate a capture of an image. The trigger is positioned to be easily actuated by the index finger of a user. A release button 110 is provided on the grip 102 to assist in deploying the device into a deployed orientation from a stowed orientation. This transition is discussed in detail below in connection with FIG. 6. A data port 112 is also provided on the grip. A data port 112 may be a Universal Serial Bus (USB) port, an IEEE 1394 port, an infrared (IR) port, or any other suitable data port. A power port 132 may be provided. Alternatively, a battery 134 may power the device.

A display assembly 104 is rotatably mounted to the lens housing such that display assembly 104 can rotate about the lens housing to a plurality of positions. In one embodiment, a plurality of positions are detented around the lens housing to correspond to expected angles relative to the grip to provide comfortable viewing for a user. Because the display assembly 104 extends laterally away from the grip, a user's hand will be beside rather than in front of a user's face during use, thereby relieving interference with the user's face, breathing and talking.

In one embodiment, a display assembly 104 can rotate a full 360°. In another embodiment, the display assembly can rotate through an arc of less than 360°, but enough to provide a plurality of sustainable locations around the arc (possibly detented) for either right or left handed use. As shown in FIG. 1, the display assembly 104 forms a substantially right angle with grip 102. It is expected that use of the display assembly at a position in which it forms an obtuse angle with the grip will provide even greater comfort for many users. In one embodiment, the device has ball bearing detents to retain the display assembly at 90° and 120° (relative to the grip) for both right-handed and left-handed use. In another embodiment, magnetic detents may be used.

As an alternative to detented positions, the display assembly may be held in a number of positions relative to the lens housing by passive frictional engagement or active clamping between components of the device.

Display assembly 104 includes a back plate 124 that provides a window 116 through which a photo flash (not shown) residing within the display assembly may be used to illuminate a target of the camera. Because, in operation, the flash is disposed a significant lateral distance from the lens 106, illumination errors, such as red eye, are significantly reduced. The display assembly 104 is biased so that the back plate 124 engages rim 126 in the deployed orientation. Rod 114 provides a shaft which may pass through back plate 124 in opposition to the bias within display assembly 104 when the display assembly is stowed. The bias may be provided by a spring about the rod 114, a spring located elsewhere, or any other manner in which a mechanical bias force may be exerted on the back plate 124. In one embodiment, the relative position of the back plate in relation to the remainder of the display assembly 104 is maintained possibly by a motor driven mechanical arm that retracts in response to a signal that the device is transitioning to a stowed orientation.

Figure 2:
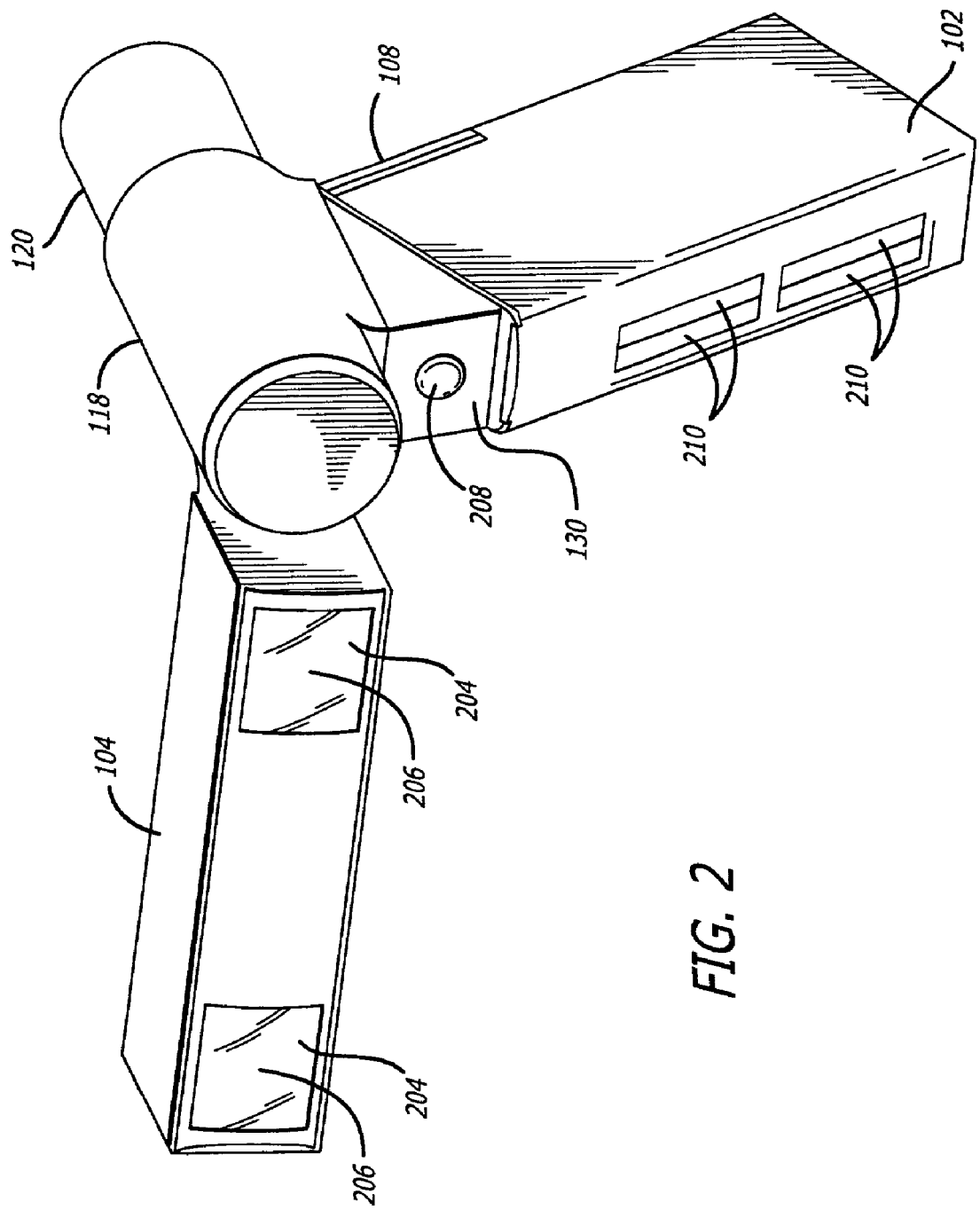
FIG. 2 is a rear right perspective view of the embodiment of FIG. 1.

FIG. 2 is a rear right perspective view of the embodiment of FIG. 1. Display assembly 104 provides a binocular display. Binocular displays are believed superior to monocular displays as they reduce eye strain. However, monocular displays are deemed within the scope and contemplation of the invention. A pair of lenses 204 are retained fixed within the display assembly 104. A pair of display elements 206 are biased to be a desired focal distance from the lenses 204 when the display assembly 104 is in the deployed orientation. That focal distance is defined by the rim 126 which engages the back plate 124 as a result of the bias described above. In this manner, a binocular view is presented to the eyes of a user. Display elements may be, for example, liquid crystal displays (LCDs), organic light emitting diode (OLED) displays, Liquid Crystal On Silicon (LCOS) displays, electroluminescent (EL) displays or retinal scanning lasers.

In one embodiment, a sensor is used to sense the angular orientation of the display assembly relative to the grip and lens. Based on that angular orientation, the image displayed on the display elements 206 is adjusted to provide consistent presentation. The ISA is typically fixed within, for example, the lens housing. Accordingly, some embodiments employ a sensor to identify the relative position of the ISA and the display assembly to adjust the image on the display assembly to accurately correspond to the view of the ISA. In one embodiment, the ISA orientation is fixed relative to the grip 102 such that changing the angle between grip 102 and display assembly 104 transitions between landscape and portrait views. Depending on the expected use angle, the ISA may be mounted at an angle within the grip so that at the expected deployed orientation, the ISA would be aligned with a horizontal reference plane.

A pointer button 208 is provided within a breech 130 of the grip 102. When the breech 130 is closed (as discussed below), the pointer button 208 is not exposed. When the breech 130 is open, the pointer button 208 is located for easy use by a user's thumb while the device is being held by grip 102. The pointer button 208 may be used to activate various functions of the device through, for example, pull down menus, icons, a virtual keypad, or other common graphical user interface mechanisms that may be presented on the display elements 206.

In one embodiment, through on screen manipulation via the pointer button, substantially all functions of the device may be used with only the pointer button 208 and the trigger 108. In one embodiment, this allows editing of images captured including additions of possible captions or other associated text. In an embodiment, zoom and/or focus of the lens 106 is controlled through on-screen virtual manipulation. In one embodiment, the trigger 108 is deemed always on when the display assembly is in the deployed orientation. Accordingly, any actuation of the trigger when the display is deployed causes an image capture to occur.

Grip 102 also includes a plurality of memory card slots 210 for memory of the same media type. In one embodiment, four memory card slots are present, more or fewer are also within the scope and contemplation of the invention. In embodiments having plural memory card slots, plural cards may be concurrently attached and may be selected electronically by a processor within the device.

Figure 3:
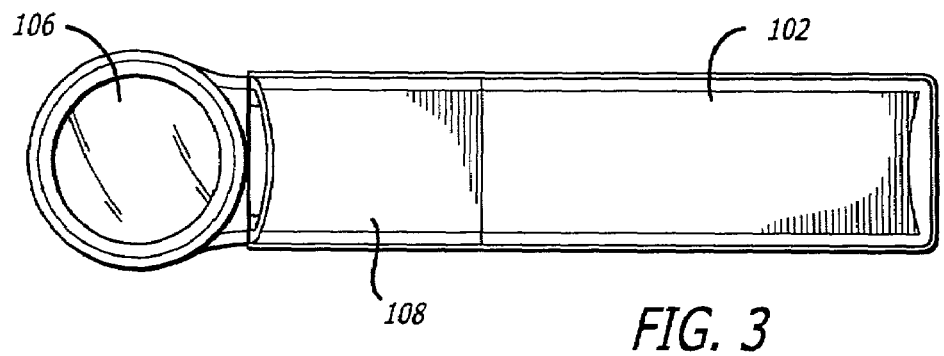
FIGS. 3-5 are front, side and rear elevational views of the embodiment of FIG. 1 in a stowed orientation.
Figure 4:
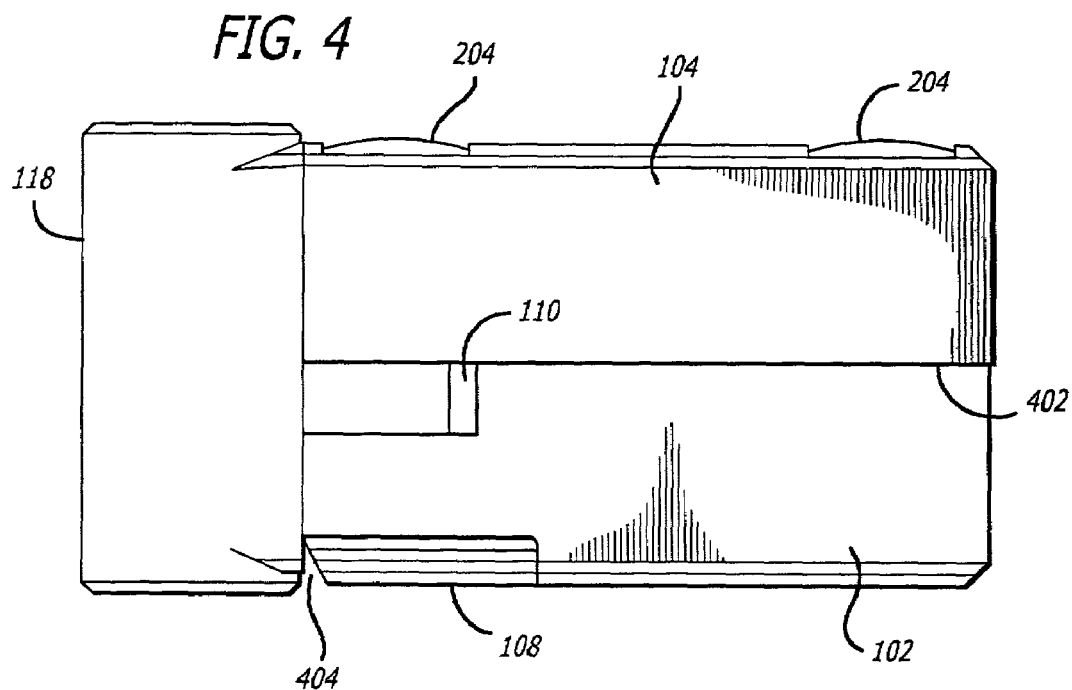
Figure 5:
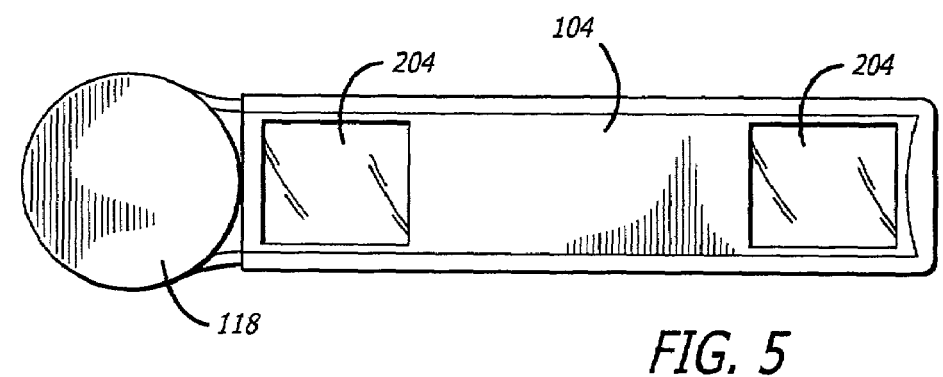

FIGS. 3-5 are front, side and rear elevational views of the embodiment of FIG. 1 in a stowed orientation. In one embodiment, in the stowed orientation, a device has a height of 27 mm, a width of 60 mm and a length of 112 mm. A display assembly sleeves over the grip as the rod 114 transitions through back plate 124 until the display assembly 104 locks in place along intersection 402. In one embodiment, a hook on the rod 114 engages a latch internal to the grip (shown in FIG. 8B). It is expected that as much as 75% of the deployed volume of the display assembly can be overlapped with the grip in the stowed orientation. Also evident in FIG. 4 is the gap 404 between grip 102 and lens housing 118 which permits the grip 102 to tilt forward in the deployed orientation. This forward tilt is believed to provide superior comfort in terms of wrist angle over either a vertical or a backward tilting grip. The grip may have a plurality of sustainable tilt angles. Similar to the display, these may be maintained by detents, frictional engagement between the parts or active clamping.

FIG. 6 shows deployment of the device in one embodiment of the invention. From the stowed orientation shown at 600, actuation of release 110 causes the display assembly to transition away from the grip. Concurrently, an expander within the display assembly causes the assembly to expand to its deployed volume at 602 by biasing the remainder of the assembly away from the back plate. Both the transition and the expansion may be driven by springs within the grip 102 and display assembly 104, respectively. Alternatively, one or both may be caused by a motor driven arm or other similar mechanism. The transition during the first stage of deployment clears the display assembly 104 from the lens housing 118 so that the display assembly 104 is free to be manually rotated about the lens housing 118 as shown at 604. After the display assembly is disengaged and rotated away, the grip 102 may be manually tilted forward to close (or partially close) the gap 404 and open the breech 130 as shown at 606. As previously noted, in one embodiment, opening the breech 130 is required to provide access to pointer button 208. It is also within the scope and contemplation of the invention to provide the grip with a bias assist in transitioning to the deployed orientation.

Figure 7:
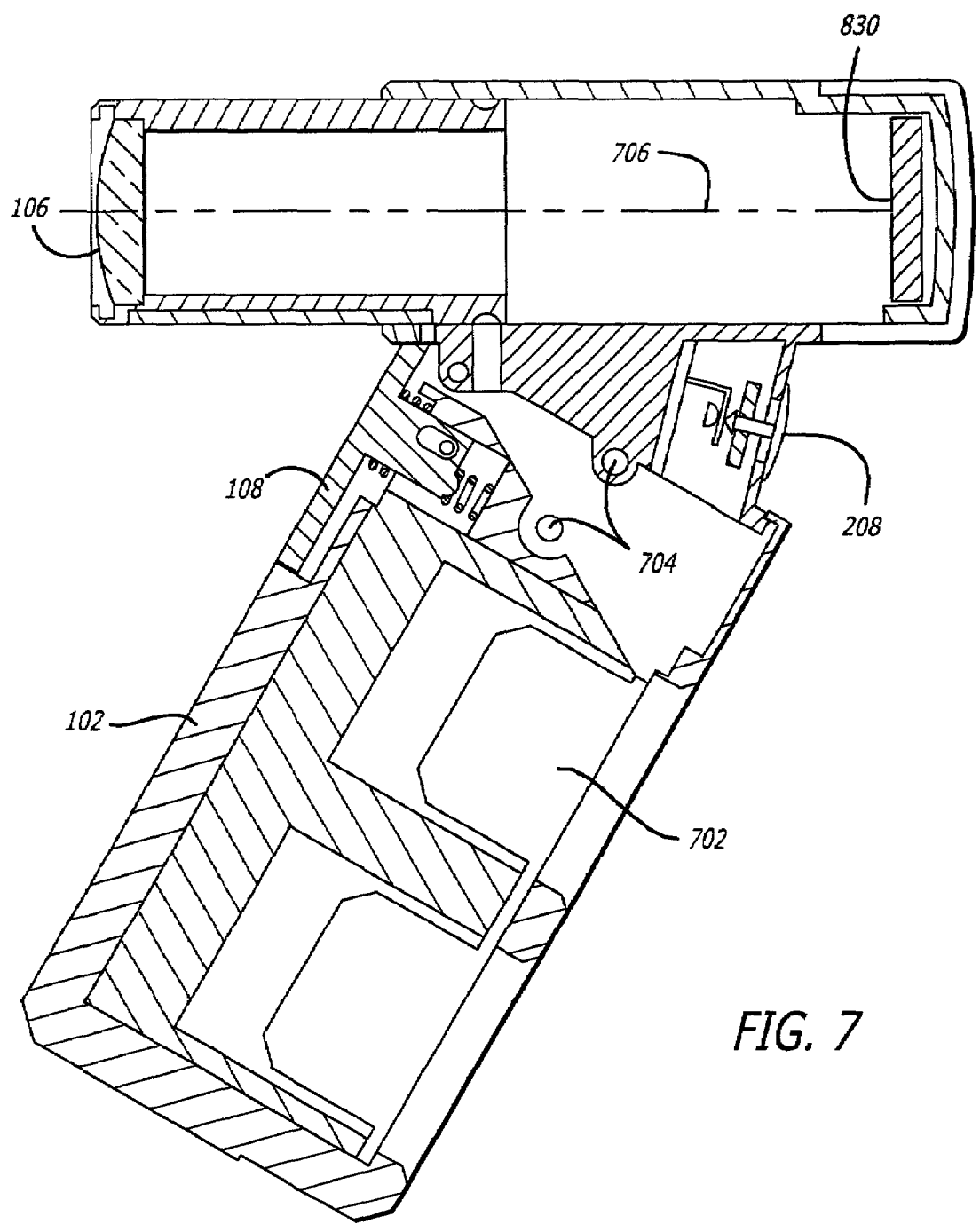
FIG. 7 is a sectional view of one embodiment of the invention.

FIG. 7 is a sectional view of one embodiment of the invention. Memory card 702 and detents 704 that define the angles off the perpendicular at which the grip 102 may be retained can be seen within grip 102. The axis of rotation 706 of the display assembly 104 may also be seen. In one embodiment, the pointer button 208 is movable within a defined region and the region is absolutely mapped to the display elements. Accordingly, anytime the pointer button 208 is at a point x with the region, the cursor will be at a corresponding point y on the display. Stated differently, there is an exactly 1 to 1 mapping between locations on the display and positions of the pointer within the region.

Figure 8A:
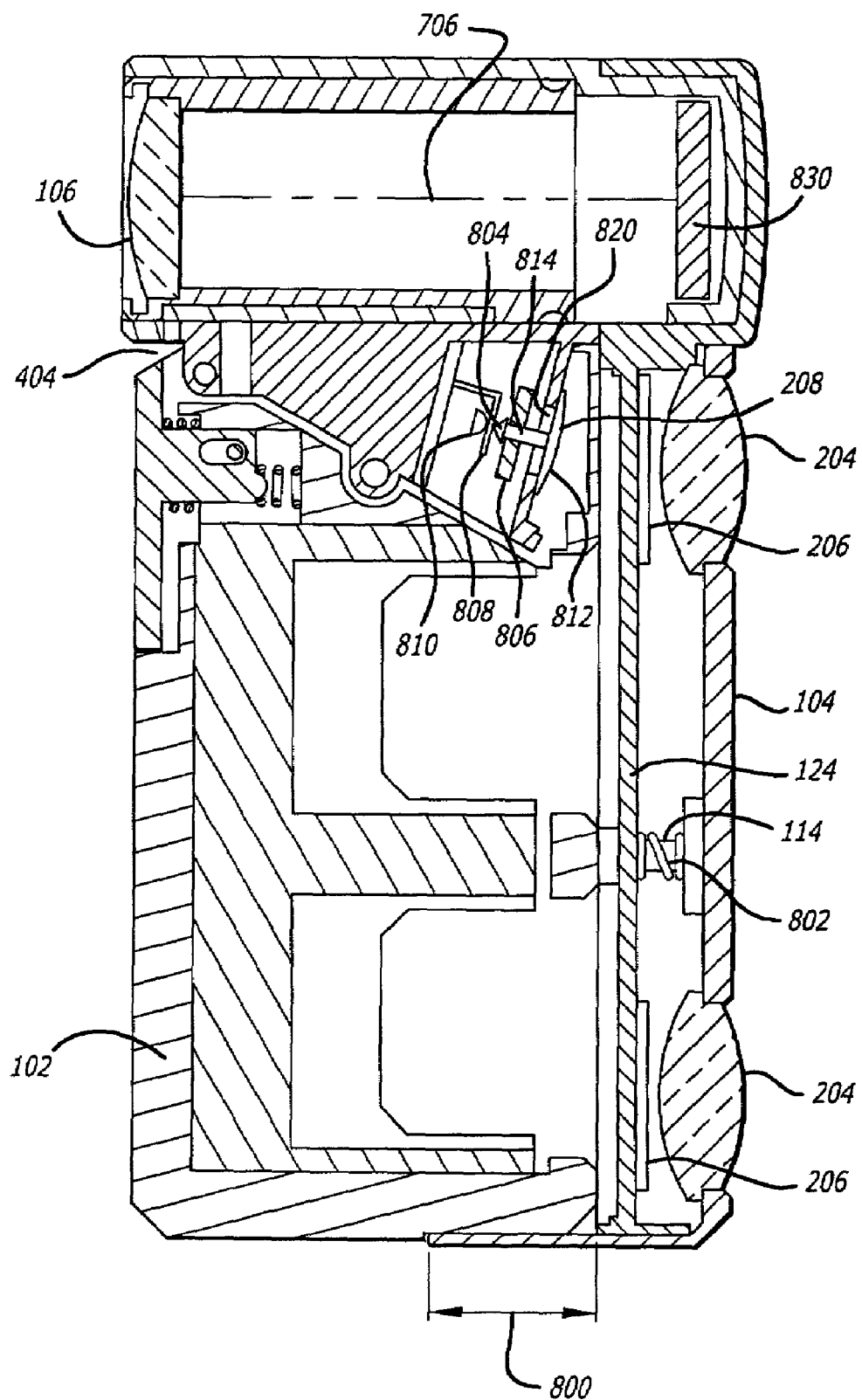
FIGS. 8A & 8B are sectional views of one embodiment in a stowed orientation.

FIG. 8A is a sectional view of one embodiment in a stowed orientation. As shown, in the stowed orientation, spring 802 is compressed along post 114 such that the display elements 206 are substantially adjacent to lenses 204. This permits the display assembly to overlap the grip 102 by an overlap distance 800, which permits a significantly more compact device in the stowed orientation.

In one embodiment, pointer button 208 has a shaft 814, a cap 812 and a point 804. The cap 812 is larger than a bore 820 that defines the area in which pointer button 208 may move. A washer 806 holds the pointer button within the bore 820 and is movable such that the shaft 814 may move from one side of the bore 820 to the other. Point 804 may contact a resistive pad 808 that maps to the display. A click dome 810 may underly the resistive pad 808 so that pressure on the cap 812 actuates the click dome 810. Alternatively, point 804 may provide optical or capacitive coupling to an underlying sensor pad that correlates the pointer location on the display with the location of the point within the area.

Figure 8B:
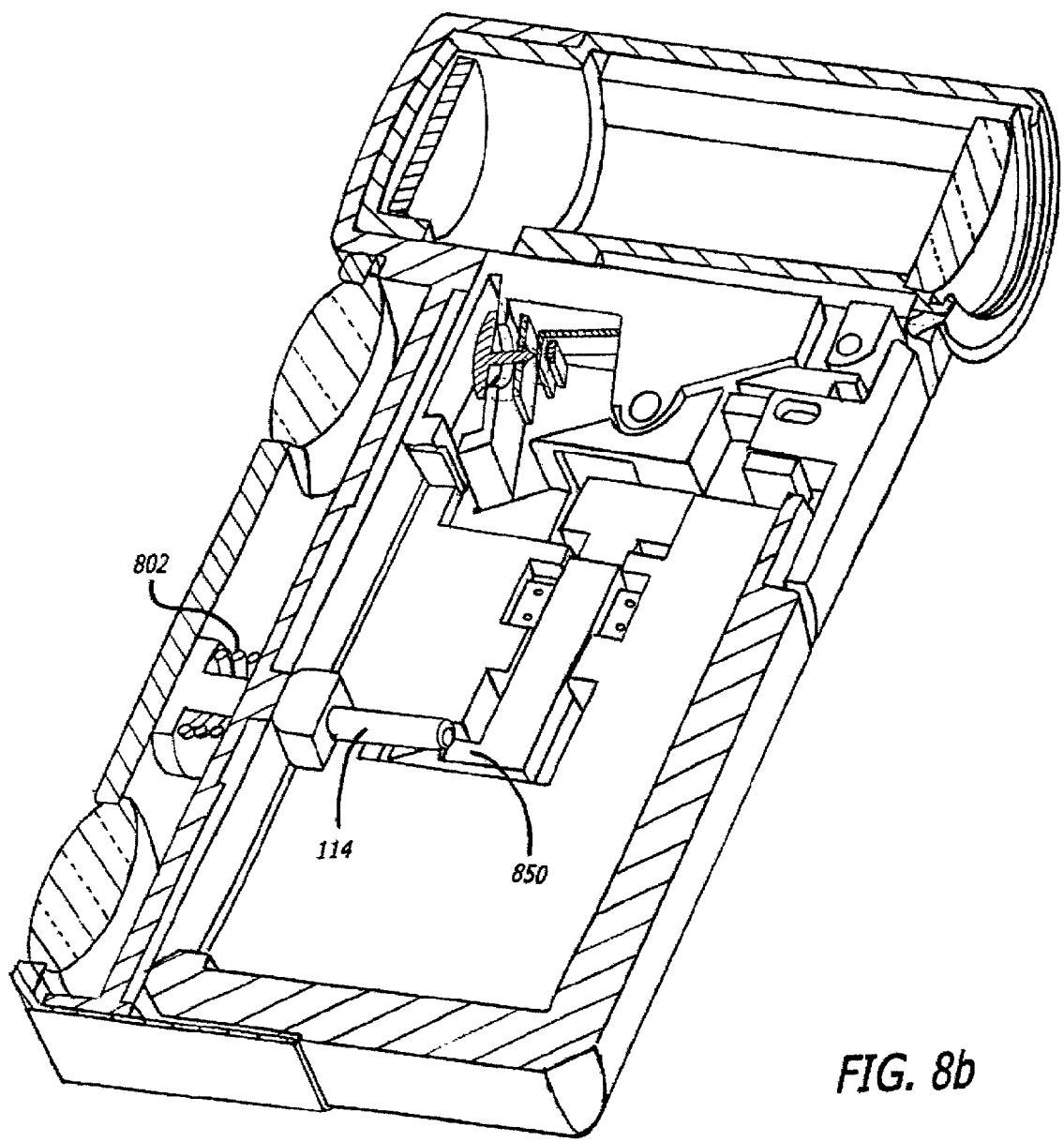

FIG. 8B is a sectional view of one embodiment in a stowed orientation. A hook of rod 114 engages internal catch 850 to retain the display assembly 104 in the stowed orientation. By depressing the release button (not shown in 8B), catch 850 pivots on a lever arm and releases the hook of rod 114. Bias spring 802 then transitions the display assembly 104 to the deployed volume as discussed above.

Figure 9:
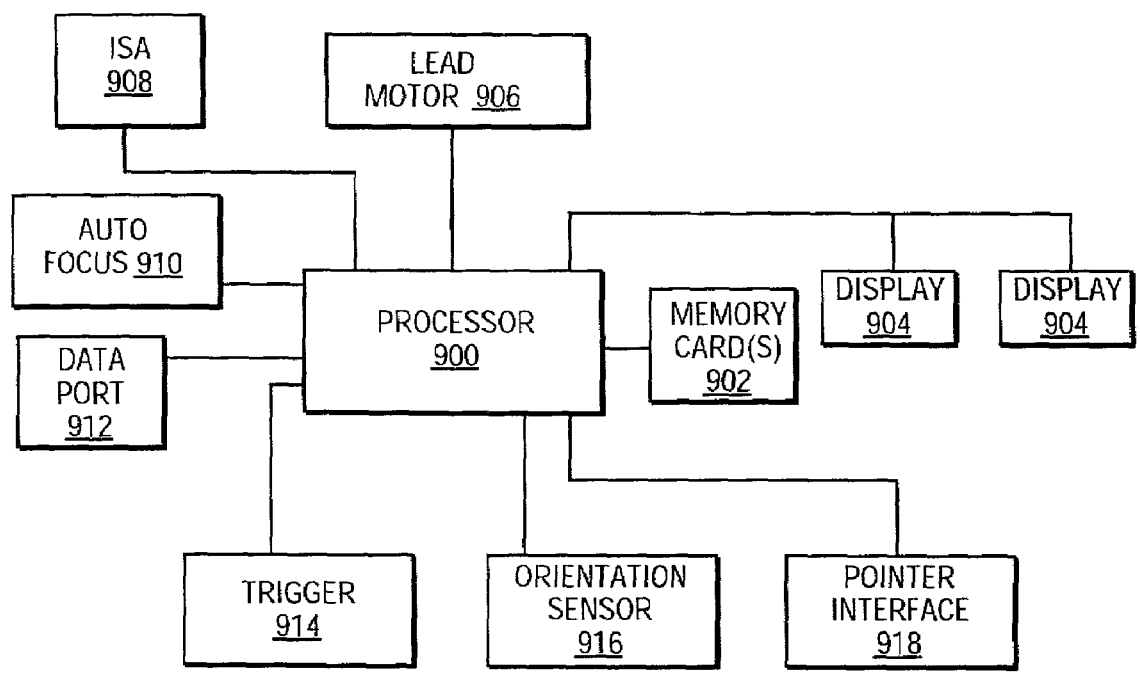
FIG. 9 is a block diagram of an electronic subsystem of one embodiment of the invention.

FIG. 9 is a block diagram of an electronic subsystem of one embodiment of the invention. The processor 900 is provided to control the operation of the device. The processor drives data to displays 904 from an Image Sensing Array (ISA) 908. The ISA 908 may be a complimentary metal oxide semiconductor (CMOS) sensor, a charge coupled device (CCD) or any other high resolution image sensing array. By providing such a high resolution (greater than 1 megapixel), users are better able to identify the quality of image capture through local viewing. One embodiment provides a display that permits local viewing at substantially the capture resolution. The processor 900 also provides control signaling to displays 904 based on information from the pointer interface 918 and orientation sensor 916. The orientation sensor 916 senses the orientation of the display assembly relative to the axis of rotation and also relative to the ISA. Based on that orientation, the processor 900 is able to adjust the displays to maintain a consistent orientation of the images displayed. The trigger input 914 provides an indication to the processor that a readout of the image sensing array 908 may be needed. After a capture occurs, the processor 900 reads out the ISA 908 to one of the memory cards 902. The processor also generally controls all data flow in or out of the data port 912 and to and from the memory cards 902. The processor may also control the lens motor 906 based on inputs from an auto focus module 910 and/or directions from the pointer interface 918.

In one embodiment, the device may be a web appliance rather than a digital camera. In such an embodiment, while the primary mechanical relationship remains the same, the lens 106 may be replaced by a radio and web interface module to provide for example, wireless access to the internet or another distributed network. The processor may execute a web browser, and the user may interact with the internet through the pointer button 208 and the trigger 108. In one embodiment, the trigger 108 performs the execute function analogous to a "return" or "enter" from a conventional keyboard. Other aspects of the device and the mechanical properties may be substantially as described above. In another embodiment, a radio having a form factor of a memory card may be introduced into one of the memory card slots, thereby enabling the camera to access a distributed network, or function in the traditional manner.

Figure 10:
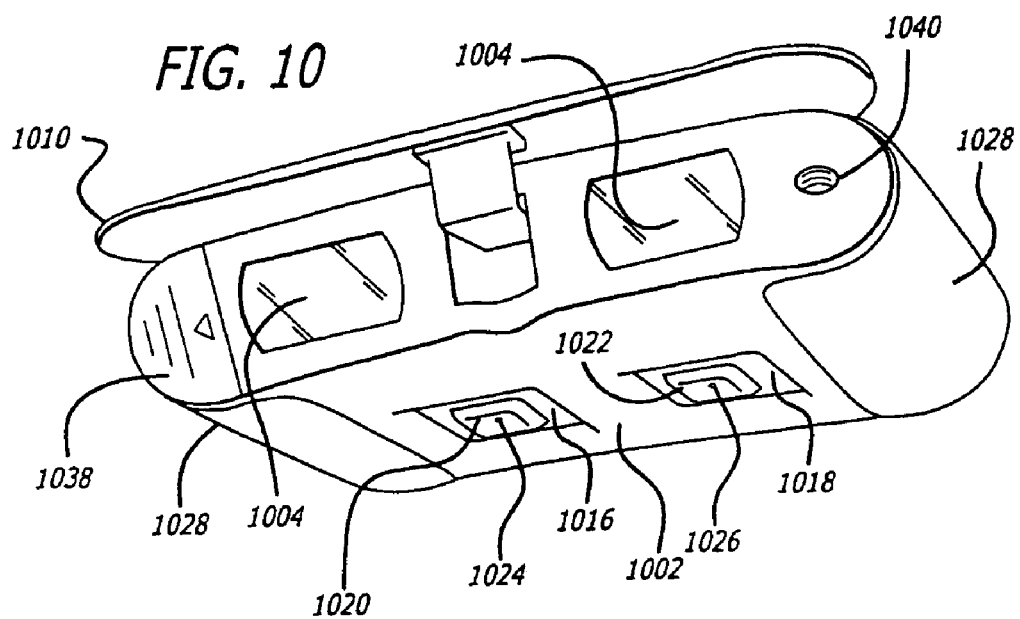
FIG. 10 is a bottom rear perspective view of an embodiment of the invention.

FIG. 10 is a bottom rear perspective view of an embodiment of the invention. A digital camera with a binocular display resides within a compact housing 1002. The housing defines a pair of lobe hand grips 1028. These hand grips 1028 may be coated within an elastomeric material to provide improved grip and holding comfort for a user. The housing 1002 defines openings in which a pair of binocular lenses 1004 may be disposed. The lenses 1004 are in the optical path of a pair of megapixel displays, which also serve as a viewfinder. As such, a user looking through the lenses is provided a high-resolution binocular view of what the camera lens currently sees. An audio output speaker 1040 may also be provided. A microphone may also be provided to permit audio annotation to be associated with an image captured.

A visor 1010 is coupled to the housing 1002 to rest on a user's forehead when the device is held by a user and thereby maintain an appropriate focal distance between a user and the lenses 1004. In one embodiment, the cross-dimension (and therefore, the focal distance) is adjustable within a range by using a hinge and slide attachment mechanism. By engaging a user's forehead rather than the soft tissue around the eyes, comfort is enhanced and usability by users wearing glasses is also facilitated. The visor 1010 also serves as a light shield, reducing ambient light contamination, and therefore, degradation of the displayed image from the user's perspective. In one embodiment, the visor 1010 is hinged to the housing and pivots between an open position (shown) and a closed position to protect the lenses 1004 when not in use. In one such embodiment, the visor 1010 transitioning to the closed position causes the display/viewfinder to enter an inactive state. Conversely, opening the visor 1010 activates the display. In one embodiment, if no display event occurs for a time period, the display automatically transitions to an inactive state to save power. In one such embodiment, the display may be reactivated by cycling the visor 1010, e.g., closing the visor 1010 and reopening it.

The housing 1002 also defines a chamber for a battery pack 1038. In one embodiment, the battery pack may be a lithium ion battery pack. Other batteries are within the scope and contemplation of the invention.

In one embodiment, a left and a right hand finger pad 1020 and 1022, respectively, provide pointer functionality on the display. Each finger pad may reside in a region 1016, 1018, which is absolutely mapped to at least a portion of the display.

In one embodiment, the regions are mapped to, for example, the right and left-hand side of the display and do not overlap. Alternatively, each region could be mapped to the entire display or have some overlap, e.g. each mapped to two-thirds of the display. Typically, the regions 1016, 1018 will be shaped and oriented similarly to the area of the display to which they map. Each finger pad 1020, 1022 is moveable in two orthogonal directions within its respective region. The finger pad may be actuated by pressing the pad substantially perpendicular to the two orthogonal directions of movement. For example, if the finger pad moves in an x-y plane, actuation occurs when the pad is pressed in a z direction. Additionally, each finger pad may be provided with a sensor 1024, 1026 to indicate when a user is engaging the respective finger pad. Such sensors may include biometric sensors, e.g., to detect galvanic skin response, pressure sensors, temperature sensors, or any other sensors which would give a reasonable indication that a user is engaging the finger pad 1020, 1022. In one embodiment, when both finger pads are engaged, each finger pad is mapped to half the display, but if only one finger pad is engages, the finger pad is remapped to the entire display.

In one embodiment, the regions 1016, 1018 may be textured to provide a tactile indication of a location within the region. Alternatively, finger pads 1020, 1022 may be coupled to a mechanical drive to provide a tactile indication of a property of the virtual environment of a cursor on the display. Two pointer buttons that are not absolutely mapped are also within the scope and contemplation of the invention. Alternatively, a pointing button may be supplied proximate to the shutter release thereby also permitting use by either hand. One or more selection buttons may also be provided. The use of these user interface devices is explained in more detail below with reference to FIGS. 12 and 13.

Figure 11:
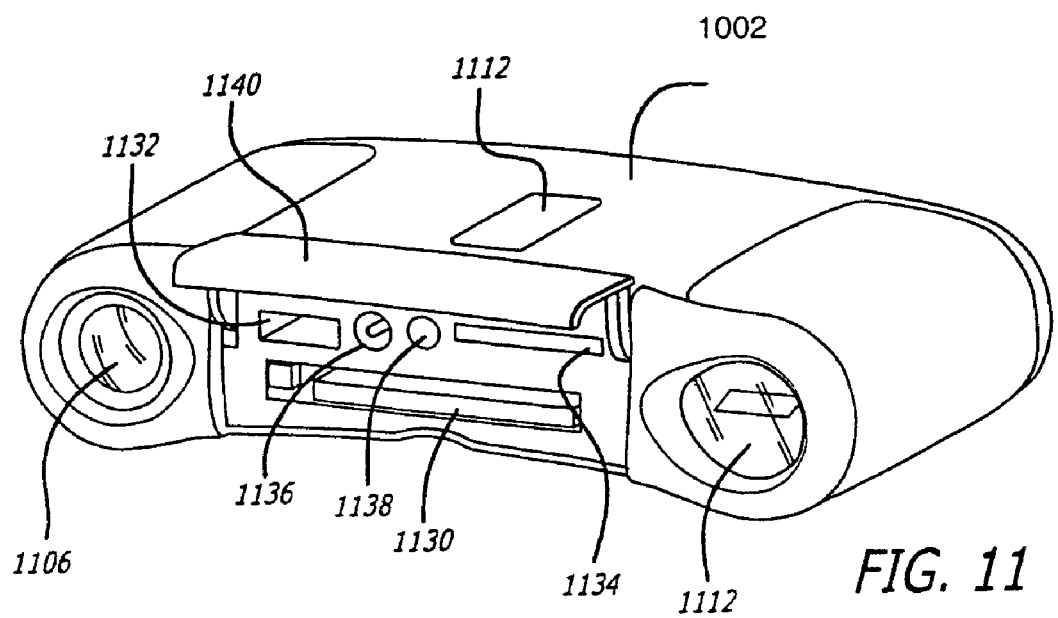
FIG. 11 is a top front perspective view of one embodiment of the device of FIG. 10.

FIG. 11 is a top front perspective view of one embodiment of the device of FIG. 10. On the opposite side of housing 1002 as the visor 1010, a door 1140 may be hinged to the housing 1002 to conceal various ports and slots. Behind the door 1140, the housing 1002 may define a memory card slot 1130 to accept any conventional memory card, such as compact flash, Bluetooth, or Microdrive disks. A secure digital ("SD") card slot 1134 may also reside behind the door. A USB or other suitable data port 1132 may be also provided. A power port 136 and an audio visual (A/V) port 1138 may also be hidden behind the door. Within one of the hand grips 1028, a flash 1112 may be disposed. A photographic lens 1106 may be disposed in the other hand grip 1028. In one embodiment, the lens 1106 may be a high-quality optical zoom lens with motorized zooming capabilities. A shutter release 1112 is provided central to the housing 1002 so that it may be actuated by the index finger of either hand when a user holds the device in an expected manner. While locations of the user interface buttons have been disclosed, other locations are within the scope and contemplation of the invention. By way of example only, the finger pads may be positioned atop the housing adjacent the shutter release to be actuated by e.g., the index finger of each hand.

Figure 12:
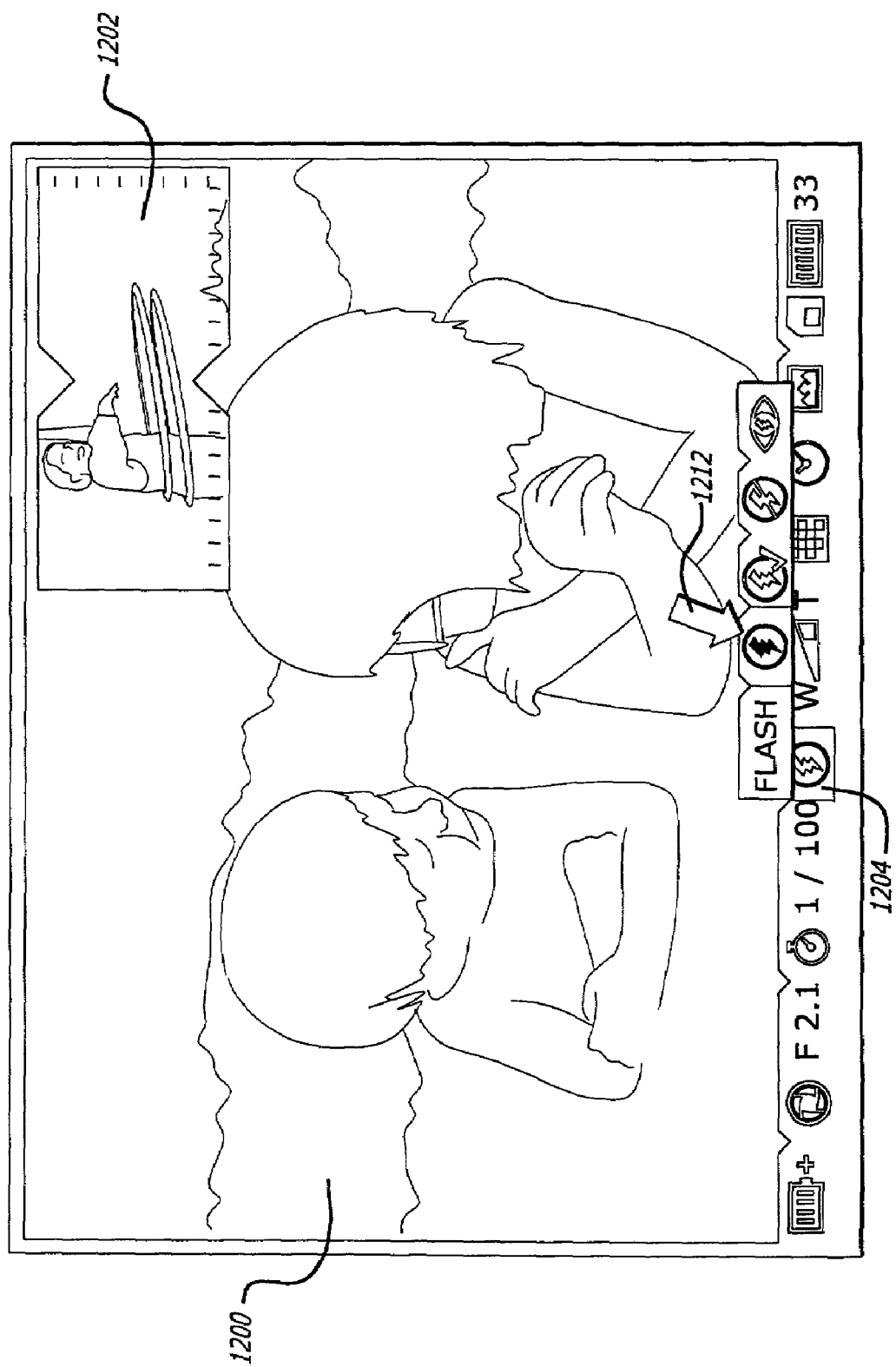
FIG. 12 shows a view of the display of one embodiment of the invention.

FIG. 12 shows a view of the display of one embodiment of the invention. Image 1200 is the current view as seen by the lens. View 1202 is inset into view 1200 and corresponds to a previously captured image. In one embodiment, it is possible to toggle the view so the current view 1200 may appear inset into a previously captured view. This picture-in-picture functionality permits a user to determine if additional image captures are desirable.

A row of icons 1204 is provided as a low profile menu bar along the bottom of the image. The low profile icon bar maximizes image space. Icons 1204 may be activated by moving pointer cursor 1212 to overlap the icon and actuating a pointer button. In one embodiment, placing the cursor over an icon 1204, e.g., for two seconds, results in a balloon style help manager. In one embodiment, pausing longer on the icon 1204 results in a full screen explanation of the icon's features. In this manner, a ROM based user manual may be accessed through the device. As previously noted, the device may be provided with either a pointer controller and pointer buttons, absolutely mapped finger pads, or some combination of the foregoing. In either case, the icon 1204, the virtual keyboard (shown in FIG. 13), and the annotation (shown in FIG. 13) and pointer cursor may be suppressed after a period of time without an input event.

Figure 13:
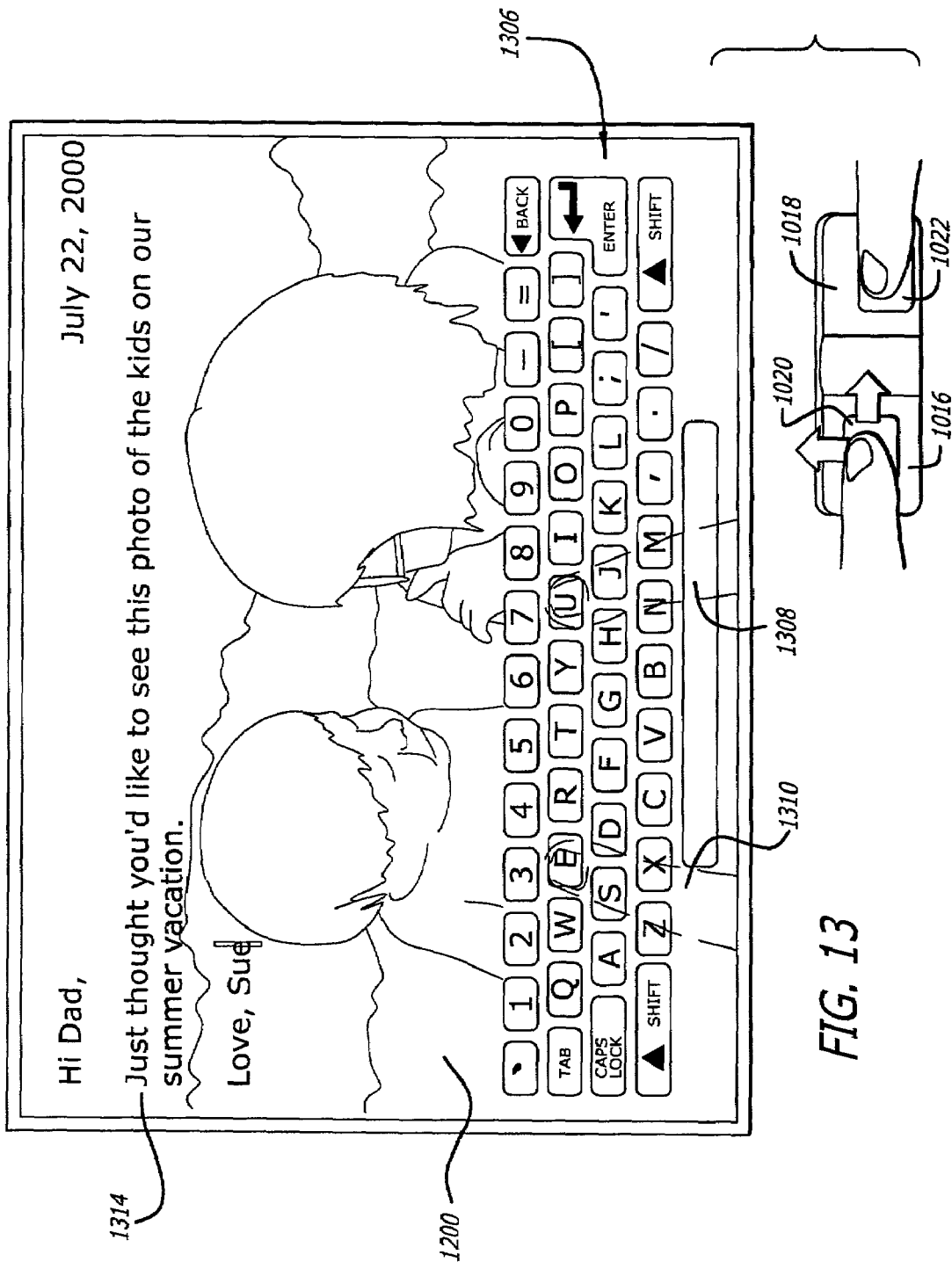
FIG. 13 shows a view of the display with a virtual key board of one embodiment of the invention.

FIG. 13 shows a view of the display with a virtual keyboard of one embodiment of the invention. A virtual keyboard 1310 is displayed to permit annotation of photographs or if the device provides web browsing functions other alphanumeric interactions with the display. In one embodiment, annotation 1314 is opened responsive to indication by the user of a desire to annotate the image. This may be done by activating an appropriate icon 1304 or may be automatic in response to detection of typing on a virtual keyboard 1206 or presence of contact on both finger pads. While the virtual keyboard 1306 is shown as a QWERTY keyboard, this need not be the case. Any organization of characters in a keypad is deemed within the scope and contemplation of the invention.

Alternatively, in the case of the mapped finger pads, the cursor 1212 and icons 1204 may appear responsive to contact with either single finger pad. The virtual keyboard 1306 may be activated responsive to detection of fingers on both finger pads. In one embodiment, both finger pads 1020, 1022 are independent and concurrently operable to activate keys on the virtual keyboard. Images of a right finger 1308 and a left finger 1310 may appear virtually so that a user may manipulate a virtual keyboard 1306 through movement of the virtual fingers 1308 and 1310. When a virtual finger 1308, 1310 is over a virtual key, the key may appear highlighted on the display. As previously noted, actuation of the finger pads may occur when pressed in a z direction. Each finger pad has an independent activator such that pressing the finger pad while a virtual finger is over a key results in a key press event for the highlighted key.

In one embodiment, each finger pad has an associated location buffer. The location buffer stores the current value of the location of the finger pad within the orthogonal axes of the region. On an actuation event, the location buffer is checked to confirm the location on actuation. This is expected to reduce error resulting from less than perfectly perpendicular actuation. Thus, in FIG. 13, the location buffer would hold a value corresponding to "1" for the right finger pad. If, during the actuation event, the user pressed down and to the left, the key press event would still be an "1," not a comma. While the virtual finger metaphor has appeal, any pair of independent location indicators may be used. By virtual hunting and pecking, annotations 1214 may readily be made.

In one embodiment, while the virtual fingers are active, the pointer cursor 1212 is not. The absolute mapping of the finger pads may take various forms. As previously noted, each region may be mapped to the entire display, or overlapping subsections of the display or partially overlapping subsections of the display. It is also within the scope and contemplation of the invention to change the mapping either automatically or under user control. For example, in one embodiment, the left finger pad may be mapped to the left-hand side of the display when the right finger pad is active and mapped to the entire display when the right finger pad is not active. This permits the pointer cursor 1212 full access to the display while restricting typing activity of the left hand to the left-hand side of the display.

Figure 14A:
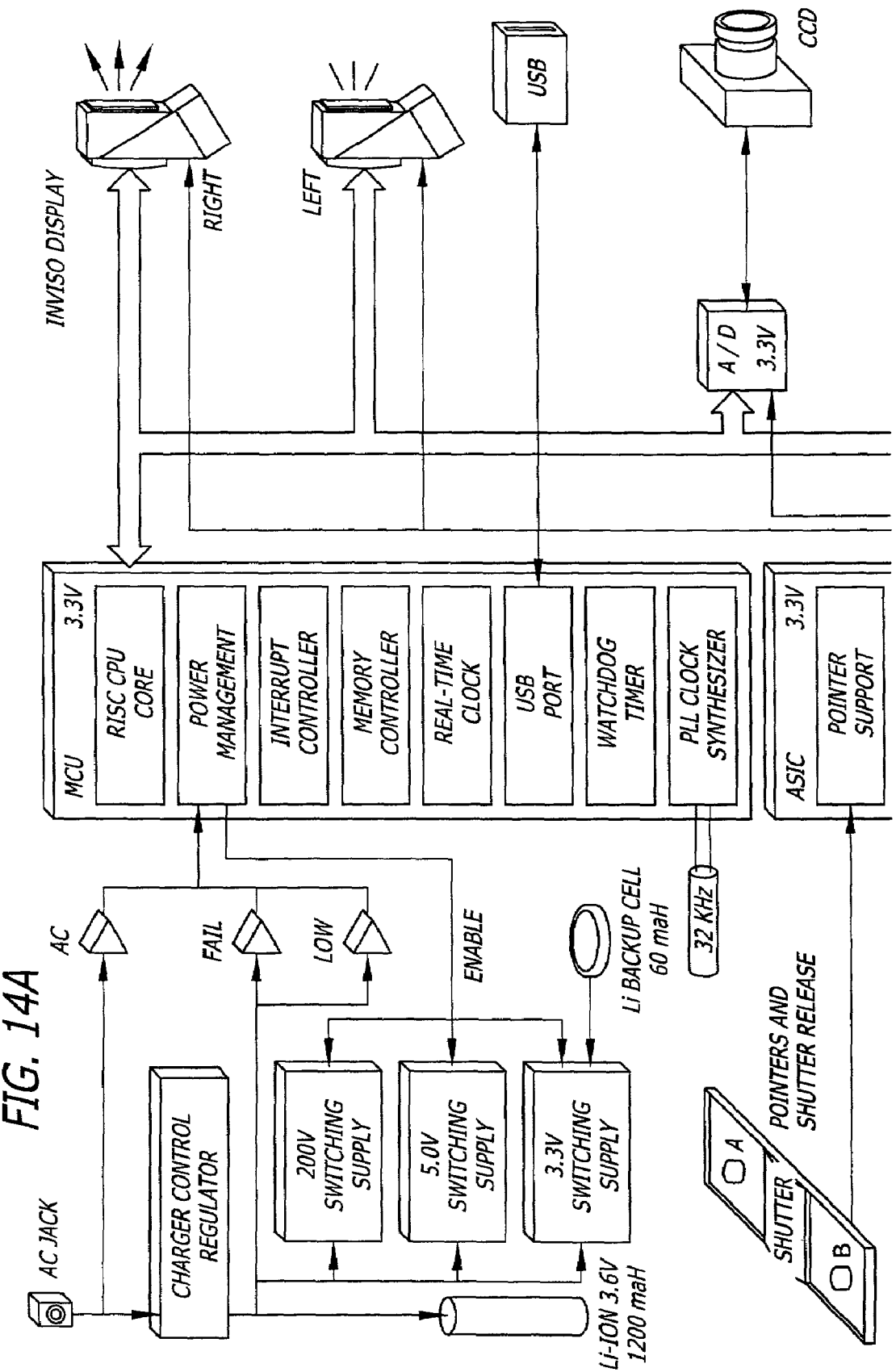
FIGS. 14A & 14B are a block diagram of a hand held device of one embodiment of the invention.
Figure 14B:
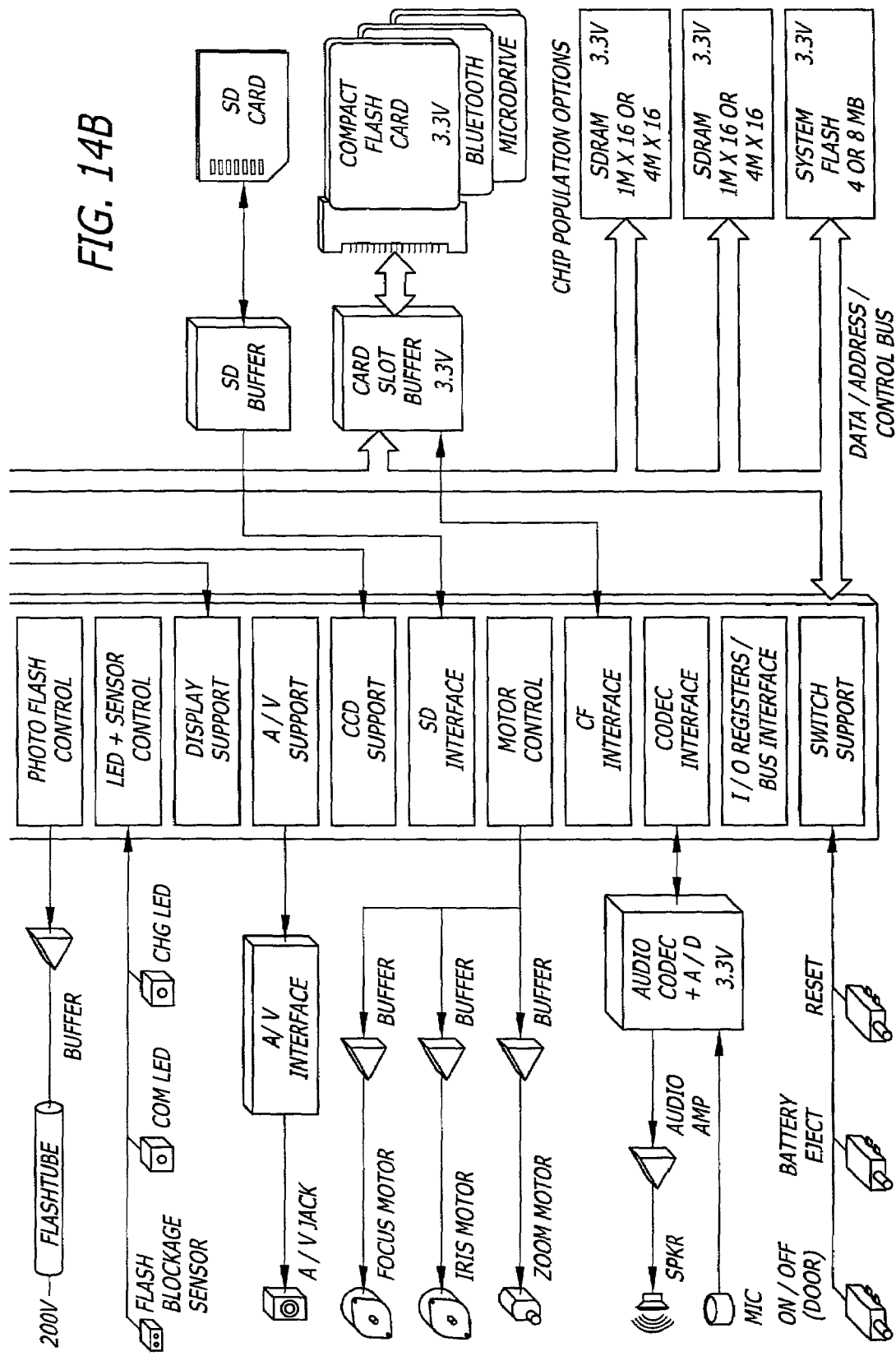

FIGS. 14A & 14B are a block diagram of a hand held device of one embodiment of the invention. Management and control unit ("MCU") is provided to control and manage subsystems of the device. An ASIC may also be provided to assist in the control of various peripherals. MCU may include a reduced instruction set computing ("RISC") central processing unit ("CPU") core which may execute an operating system ("O/S") such as, Windows CE available from Microsoft Corporation of Redmond, Wash. Other operating systems such as, Linux, Symbian, Palm O/S, VX Works or other Proprietary O/S may be used. In one embodiment, the CPU also executes one or more applications under the control of the O/S. Possible applications include a text editor which may include: word processing, specialized picture and text layout tools, and image-centric document templates. An image capture manager may be provided which may provide screen based controls and display of vital data about the settings, dialog box warnings and the balloon help (described with reference to FIG. 13 above). A photo editor may also be provided, which provides tools to adjust color of, contrast of, crop, scale, and rotate images captured. An image file manager may also be provided which may provide image history such as date of capture, as well as category notes, edit trail, compression of images, sorting tools, automatic review and timing for action sequences for a series of captured images. A plurality of device drivers may be executed by the CPU core under the control O/S. Such device drivers may include a display driver, CCD lens driver, a storage media driver, audio driver, power manager, virtual keyboard driver, and pointer interface drivers. Other drivers may be used if required to drive additional subsystems and may be executed by the CPU core. In one embodiment, a user manual is retained in non-volatile memory within the device. Software updates are easily done either through the USB port or through one of the media card slots. This provides great flexibility and a robust device adaptable with changes in technology. This also permits different price points depending on the software supplied.

It should be noted that features shown or described with reference to one embodiment may be applicable to another embodiment even when not explicitly called out and such is within the scope and contemplation of the invention. In the foregoing specification, the invention has been described with reference to specific embodiments thereof. It will be further evident that various modifications and changes can be made thereto without departing from the broader spirit and scope of the invention as set forth in the appended claims. The specification and drawings are, accordingly, to be regarded in an illustrative rather than a restrictive sense.

What is claimed is:

1. An apparatus comprising:
   a housing;
   a grip coupled to the housing;
   a binocular digital display assembly coupled to the housing and rotatable about the housing between a plurality of angular positions which can be mechanically maintained during use; and
   wherein the display assembly has a stowed orientation and a deployed orientation and wherein when in the stowed orientation, at least 25% of a deployed volume of the display assembly overlaps with a volume of the grip.

2. The apparatus of claim 1 wherein the binocular display assembly comprises:
   a first lens;
   a first display element disposed to be a focal distance from the first lens when the display assembly is in a deployed orientation;
   a second lens; and
   a second display element disposed to be a focal distance from the second lens when the display is in a deployed orientation.

3. The apparatus of claim 2 wherein the display elements are one of liquid crystal displays (LCDs), organic light emitting diode (OLED) displays, Liquid Crystal On Silicon (LCOS) displays, electroluminescent (EL) displays, and retinal scan lasers.

4. The apparatus of claim 1 further comprising:
   a self powered expander which when actuated expands the display assembly from its stowed volume to its deployed volume.

5. The apparatus of claim 1 further comprising:
   self powered positioner which when actuated transitions the display assembly from its stowed orientation to its deployed orientation.

6. The apparatus of claim 1 further comprising:
   a lens assembly within the housing; and
   an image sensing array (ISA) optically coupled to the lens assembly.

7. The apparatus of claim 6 further comprising:
   a sensor to detect a position of the display assembly relative to the ISA and cause an adjustment to an image displayed on the display assembly based on the position to maintain a consistent orientation of a target on the display.

8. The apparatus of claim 1 further comprising:
   a distributed network interface coupled to the display assembly.

9. The apparatus of claim 6 wherein the binocular display assembly comprises:
   a photographic light source.

10. The apparatus of claim 6 wherein the binocular display assembly comprises:
    a photographic light source positioned sufficiently far from the lens assembly to reduce illumination errors.

11. The apparatus of claim 6 further comprising:
    a trigger to cause a capture by the ISA, the trigger disposed on the grip to allow actuation by an index finger of a hand holding the grip.

12. The apparatus of claim 11 wherein any actuation of the trigger causes a capture.

13. The apparatus of claim 1 further comprising:
    a pointer button coupled to the grip to provide an interface for user manipulation of a pointer within the display.

14. The apparatus of claim 13 wherein the pointer button is disposed to allow actuation by the thumb of a hand holding the grip.

15. The apparatus of claim 13 wherein the pointer button is only accessible when the grip is in a deployed orientation.

16. The apparatus of claim 13 wherein the pointer button resides within a region and wherein a position of the pointer button within the region is absolutely mapped to the display.

17. The apparatus of claim 13 wherein the trigger and the pointer button provide access to substantially all user controls without the need for other buttons.

18. The apparatus of claim 1 wherein the apparatus defines a plurality of memory card slots.

19. The apparatus of claim 6 further comprising:
    a plurality of memory card interfaces to permit a plurality of memory cards to be concurrently attached and electronically selected by the apparatus.

20. The apparatus of claim 1 wherein at least a first position is suitable for right handed use and at least a second position is suitable for left-handed use.

21. The apparatus of claim 1 wherein in the deployed orientation, the grip may pivot to at least one self maintaining position on an axis orthogonal to an axis of rotation of the display assembly.

22. An apparatus comprises:
    a housing;
    a grip coupled to the housing; and a binocular digital display assembly coupled to the housing and rotatable about the housing between a plurality of angular positions which can be mechanically maintained during use;

a visor coupled to the housing and to rest upon a forehead of the user when held by a user for use, the visor having a cross-dimension selected to maintain a predetermined focal distance between the first lens and an eye of the user, the visor pivots coupled to the display assembly to pivot between an open and a closed position wherein pivoting the visor to the open position activates the display; and a timer that times out after a predetermined time during which no display event occurred, the time out causing the display to deactivate wherein cycling the visor activates the display.

23. The apparatus of claim 22 wherein when the visor is in the closed position, the display is in an inactive state.

24. The apparatus of claim 22 wherein the visor protects a lens of the display assembly when in the closed position.

25. An apparatus comprising:
a housing;
a handle coupled to the housing having a stowed orientation and a deployed orientation; and
a digital display assembly coupled to the housing, having a stowed orientation and a deployed orientation, such that, in the deployed orientation, the display is laterally displaced relative to the handle such that, in use, a hand holding the handle is laterally displaced relative to a frontal face of a head of a user, the handle and digital display assembly forming any one of an obtuse or an acute angle with the handle extending downward from the digital display assembly, and the digital display assembly extending across an eye of the user wherein in the stowed orientation at least 25% of a deployed volume of the display assembly overlaps with a volume of the handle.

26. The apparatus of claim 25 further comprising:
a pointer button coupled to the handle to provide an interface for user manipulation of a pointer on the display, wherein, the pointer button is only accessible when the handle is in the deployed orientation.

27. The apparatus of claim 25 further comprising:
a sensor to detect relative rotation of the display assembly and to signal the display to adjust an image on the display to maintain a consistent orientation of an image displayed.

28. The apparatus of claim 25 further comprising:
a self powered expander which when actuated expands the display assembly from its stowed volume to its deployed volume.

29. The apparatus of claim 25 further comprising:
a self powered positioner which when actuated transitions the display assembly from its stowed orientation to its deployed orientation.

30. The apparatus of claim 25 further comprising:
a lens assembly coupled to the handle; and
an image sensing array (ISA) optically coupled to the lens assembly.

31. The apparatus of claim 30 further comprising:
a sensor to detect a position of the display assembly relative to the ISA and cause an adjustment to an image displayed on the display assembly based on the position to maintain a consistent orientation of a target on the display.

32. The apparatus of claim 25 further comprising:
a distributed network interface coupled to the display assembly.

33. The apparatus of claim 32 further comprising:
a photographic light source.

34. The apparatus of claim 32 further comprising:
a photographic light source positioned sufficiently far from the lens assembly to reduce illumination errors.

35. The apparatus of claim 32 further comprising:
a trigger to cause a capture by the ISA, the trigger disposed on the handle to allow actuation by an index finger of a hand holding the handle.

36. The apparatus of claim 25 wherein in the deployed orientation, the handle may pivot to at least one self maintaining position on an axis orthogonal to an axis of rotation of the display assembly.

37. The apparatus of claim 27 wherein in the deployed orientation, the handle defines a first acute angle away from a body of an operator to permit comfort and reduce stress on the hand and arm.

38. The apparatus of claim 37 wherein any actuation of the trigger causes a capture.

39. The apparatus of claim 25 wherein the pointer button resides within a region and wherein a position of the pointer button within the region is absolutely mapped to the display.

40. The apparatus of claim 25 wherein the trigger and the pointer button provide access to substantially all user controls without the need for other buttons.

41. The apparatus of claim 25 wherein apparatus defines a plurality of memory card slots.

42. The apparatus of claim 32 further comprising:
a plurality of memory card interfaces to permit a plurality of memory cards to be concurrently attached and electronically selected by the apparatus.

43. An apparatus comprising:
a housing;
a handle coupled to the housing having a stowed orientation and a deployed orientation;
a digital display assembly coupled to the housing, having a stowed orientation and a deployed orientation, such that, in the deployed orientation, the display is laterally displaced relative to the handle such that, in use, a hand holding the handle is laterally displaced relative to a frontal face of a head of a user, the handle and digital, display assembly forming any one of an obtuse or an acute angle with the handle extending downward from the digital display assembly, and the digital display assembly extending across an eye of the user wherein in the stowed orientation at least 25% of a deployed volume of the display assembly overlaps with a volume of the handle;
a visor coupled to the housing and to rest upon a forehead of the user when held by a user for use, the visor having a cross-dimension selected to maintain a predetermined focal distance between the first lens and an eye of the user, the visor pivots coupled to the display assembly to pivot between an open and a closed position wherein pivoting the visor to the open position activates the display;
a timer that times out after a predetermined time during which no display event occurred, the time out causing the display to deactivate; and
wherein cycling the visor activates the display.

44. The apparatus of claim 43 wherein when the visor is in the closed position, the display is in an inactive state.

45. The apparatus of claim 43 wherein the visor protects a lens of the display assembly when in the closed position.

* * * * *